(12) United States Patent
Ruthinowski et al.

(10) Patent No.: US 10,434,976 B2
(45) Date of Patent: Oct. 8, 2019

(54) SEATBELT ASSEMBLY

(71) Applicant: FORD GLOBAL TECHNOLOGIES, LLC, Dearborn, MI (US)

(72) Inventors: Richard Edward Ruthinowski, Taylor, MI (US); Robert W. McCoy, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/906,082

(22) Filed: Feb. 27, 2018

(65) Prior Publication Data

US 2019/0263348 A1    Aug. 29, 2019

(51) Int. Cl.
  *B60R 22/185*  (2006.01)
  *B60R 22/28*   (2006.01)
  *A44B 11/25*   (2006.01)
  *B60R 22/18*   (2006.01)

(52) U.S. Cl.
  CPC ...... *B60R 22/1855* (2013.01); *A44B 11/2561* (2013.01); *B60R 22/28* (2013.01); *B60R 2022/1806* (2013.01); *B60R 2022/1812* (2013.01); *B60R 2022/281* (2013.01); *B60R 2022/286* (2013.01)

(58) Field of Classification Search
  CPC ........ B60R 2022/281; B60R 2022/286; B60R 2022/287; B60R 22/28; B60R 22/195; B60R 22/185; B60R 22/1855; B60R 2022/1806; B60R 2022/1812; A44B 11/2561

USPC ......................................... 297/471, 480, 472
See application file for complete search history.

(56) References Cited

U.S. PATENT DOCUMENTS

| | | | | |
|---|---|---|---|---|
| 5,058,244 | A * | 10/1991 | Fernandez | A44B 11/12 24/136 K |
| 5,507,552 | A | 4/1996 | Ineich et al. | |
| 7,325,280 | B2 | 2/2008 | Ichida | |
| 7,996,964 | B2 * | 8/2011 | Wendt | B60R 22/28 24/593.1 |
| 8,172,267 | B2 | 5/2012 | Eberle et al. | |
| 9,332,810 | B2 * | 5/2016 | Hortnagl | A44B 11/10 |
| 9,988,013 | B2 * | 6/2018 | Cahill | B60R 22/28 |
| 2004/0158955 | A1 * | 8/2004 | Acton | A44B 11/2557 24/265 BC |
| 2006/0214494 | A1 | 9/2006 | Katayama | |
| 2006/0226694 | A1 | 10/2006 | Higuchi et al. | |
| 2012/0068520 | A1 * | 3/2012 | McFalls | A44B 11/2553 297/468 |

(Continued)

FOREIGN PATENT DOCUMENTS

| | | |
|---|---|---|
| JP | 2002211354 A | 7/2002 |
| JP | 4917510 B2 | 2/2012 |
| JP | 2012250558 A | 12/2012 |

(Continued)

*Primary Examiner* — Milton Nelson, Jr.
(74) *Attorney, Agent, or Firm* — Frank A. MacKenzie; MacMillan, Sobanski & Todd, LLC

(57) ABSTRACT

A seatbelt and method of operating a seatbelt that allows webbing to slide between a lap portion and a torso portion through an unlocked weblock of a tongue assembly, and upon forces exerted on the webbing by an occupant, the weblock locking the webbing from movement between the lap and torso portions while flexing to allow for webbing payout in the torso portion.

6 Claims, 7 Drawing Sheets

(56) References Cited

U.S. PATENT DOCUMENTS

2012/0286501 A1 11/2012 Goudeau et al.
2017/0297528 A1* 10/2017 Hermann ............ B60R 22/1855

FOREIGN PATENT DOCUMENTS

| JP | 2013018460 A | 1/2013 | | |
|----|--------------|--------|---|---|
| KR | 20110045716 | 5/2011 | | |
| WO | WO-2017162244 A1 * | 9/2017 | ............. | B60R 22/18 |

* cited by examiner

SEATBELT ASSEMBLY

BACKGROUND OF INVENTION

This invention relates to a seatbelt assembly employed in a vehicle, and in particular to a tongue assembly portion of a seatbelt assembly.

Seat belts in vehicles are used to restrain the occupants during vehicle impact events. Typically, the seat belt is arranged with a combination of a lap and shoulder belt, with the webbing extending through a tongue assembly for adjusting the amount of webbing between the portion extending across the lap and the portion extending across the torso of the vehicle occupant. While the webbing is adjustable between the lap and torso portions as one is putting-on the seat belt, during an impact event, the tongue assembly is generally configured to hold (i.e., lock) the webbing relative to each portion in order to fully support the vehicle occupant's lap and torso. Accordingly, it is desirable for the seat belt to provide good support for both the occupant's lap and the occupant's torso, and for the tongue to operate in such a way so as to assist in providing good support for both the lap and torso portions of the seat belt.

SUMMARY OF INVENTION

An embodiment contemplates a method of operating a vehicle seatbelt, comprising: allowing webbing to slide between a lap portion and a torso portion through an unlocked weblock of a tongue assembly; and upon forces exerted on the webbing by an occupant, the weblock locking the webbing from movement between the lap and torso portions while flexing to allow for webbing payout in the torso portion.

An embodiment contemplates a seatbelt including a tongue assembly having a weblock and a tongue selectively securable to a buckle, a webbing extending through the weblock between a torso portion and a lap portion, and with the weblock allowing for the webbing sliding between the torso and lap portions when in an unlocked position and flexing in a locked position to prevent sliding between the lap and torso portions while providing webbing payout in the torso portion.

An advantage is in maintaining seatbelt assembly comfort, ease of use and safety capabilities for vehicle occupants, while enhancing functionality of the seatbelt assembly. During a vehicle event where an occupant wearing the seatbelt pushes forward into the webbing, a weblock of the tongue assembly locks the belt between torso portions and lap portions, which essentially prevents payout of the lap portion via the tongue assembly while allowing for a small amount of payout in the torso portion in order to potentially reduce chest deflection under such a loading condition.

DETAILED DESCRIPTION

Figure 1:
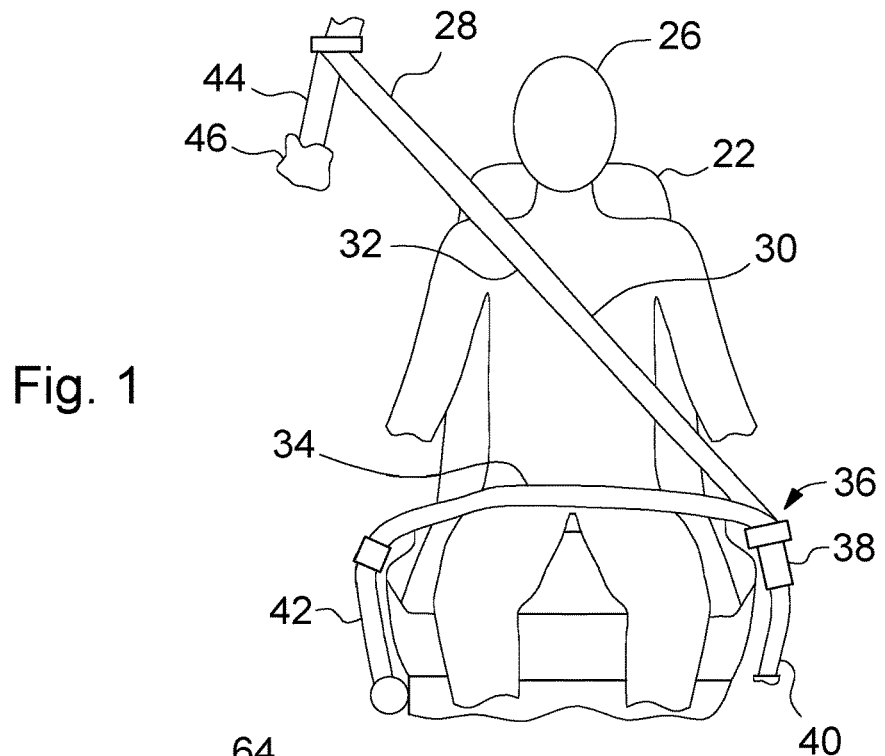
FIG. 1 is a schematic of a vehicle occupant seated in a vehicle seat, with a seat belt securing the occupant in place.
Figure 2:
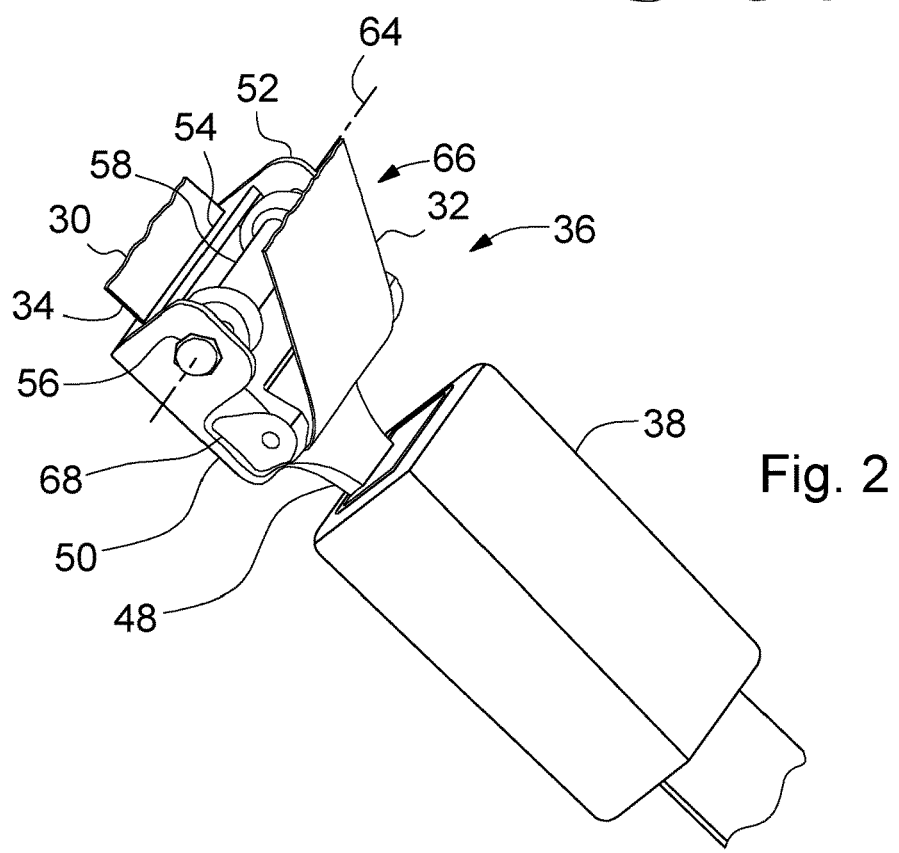
FIG. 2 is a schematic perspective view of a tongue assembly and buckle, with a weblock in an unlocked position.
Figure 3:
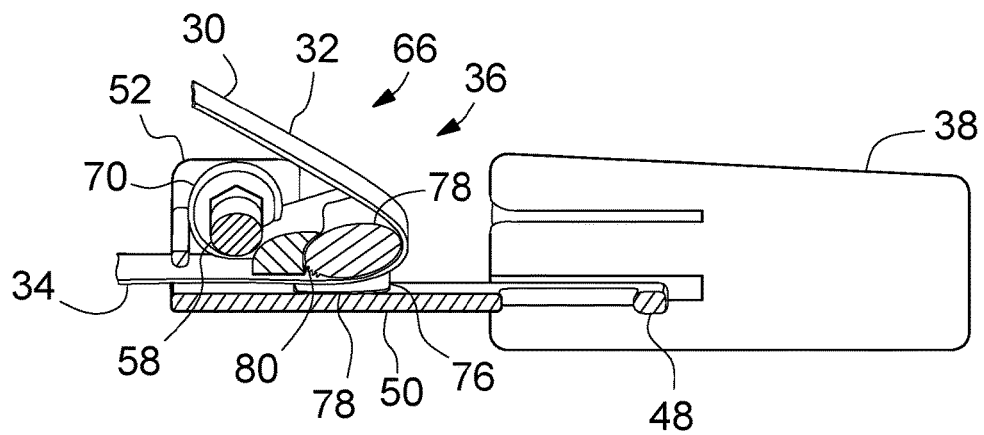
FIG. 3 is a schematic, side, partial cross section view of the tongue assembly and buckle, with the weblock in an unlocked position.

FIG. 1 shows a portion of a vehicle, having a vehicle seat 22 mounted to vehicle structure 24. An occupant 26 is shown sitting in the seat 22 and secured therein by a seatbelt 28, shown in the buckled condition.

The seat belt 28 includes webbing 30, which includes a torso portion 32 extending across the occupant's torso and a lap portion 34 extending across the occupant's hips. The webbing 30 extends through a tongue assembly 36 and is selectively slidable through this tongue assembly 36 between the lap portion 34 and the torso portion 32. The tongue assembly 36 is selectively secured to and released from a buckle (clasp) 38, which is secured, via a support 40, to the seat 22 or vehicle structure 24. An end 42 of the lap portion 34 of the webbing 30 is secured to the vehicle structure 24 or seat 22. Thus, when the tongue assembly 36 is locked to prevent webbing 30 from sliding through it, the lap portion 34 secures the occupant's hips in the seat 22.

The torso portion 32 of the webbing 30 has an end 44 that extends into a retractor mechanism 46 (not shown in any detail herein as this mechanism may be conventional) attached to the vehicle structure 24 (such as a vertical pillar of the vehicle). The retractor mechanism 46 may have inertial or other types of locks that selectively allow for extending more webbing into the torso portion 32 of the webbing 30 to allow for the occupant 26 to put on the seat belt but prevent (or extensively limit) webbing to extend from the retractor during certain vehicle deceleration events. This type of operation of the retractor mechanism 46 may be conventional and so will not be discussed in further detail herein.

Referring now to FIGS. 2-6, an embodiment of the tongue assembly 36 and buckle 38 are shown. The buckle 38 may be conventional and so is shown only schematically in FIGS. 2-5. A tongue 48 of the tongue assembly 36 can be selectively locked into and released from the buckle 38, which may be conventional and so will not be discussed further herein.

The tongue 48 may be a portion of or attached to a tongue plate 50, which has tongue walls 52 extending generally normal to the tongue plate 50. The tongue walls 52 may include a webbing guide slot 54, through which the webbing 30 slides, and a pair of tongue apertures 56, which may be circular or may be keyed such as in a hex shape.

A bar 58 extends into each tongue aperture 56 and may have a keyed (hexagonal) end 60 that his secured against rotation in one of the tongue apertures 56 and an opposed end 62 that is secured in the other tongue aperture 56. This bar may define an axis 64 about which a weblock 66 pivots.

The weblock 66 includes a housing 68, which includes bar supports 70 having channels 72 through which the bar 58 extends. The channels 72 may be keyed to match a corresponding keyed (e.g. hexagonal) midsection 74 of the bar 58, which would limit rotation of the bar 58 relative to the bar supports 70. The housing 68 also includes a webbing slot 76 through which the webbing 30 is guided. The weblock 66 also includes a lock 78 having a lock feature 80, which locks the webbing 30 to the housing 68 to prevent feeding of the webbing 30 between the lap portion 34 and the torso portion 32 when the lock feature 80 is in a locked position. The lock feature 80 may be, for example, teeth or other engineered textured surface extending from an oblong cylindrical lock 78, with the teeth/textured surface engageable with the webbing 30 under certain operating conditions. The lock 78 may include a spring (not shown) to rotate the lock feature 80 out of contact with the webbing 30 when the weblock 66 is not under a load from the occupant 26. The force of the spring, then, is overcome when the occupant 26 presses into the webbing 30, causing the lock 78 to rotate, which in turn causes the lock feature 80 to press against the webbing 30. This lock feature 80 pressing against the webbing 30 locks the webbing 30 from moving between the torso portion 32 and the lap portion 34.

The operation of the tongue assembly 36 with weblock 66 will now be discussed relative to FIGS. 1-6. Under typical vehicle operating conditions when the seatbelt 28 is in the buckled position (shown in FIG. 1), there are minimal forces acting on the tongue assembly 36, in which case the lock 78 in the housing 68 is angled so that the lock feature 80 does not engage the webbing 30. This condition can be seen in FIGS. 2 and 3. Since the lock feature 80 does not engage the webbing 30 in this condition, the webbing is relatively free to slide between the torso portion 32 and the lap portion 34, allowing for comfort of the occupant 26.

Figure 4:
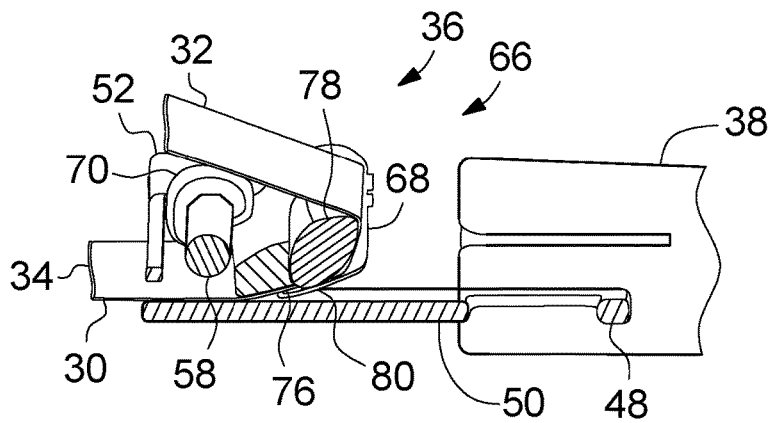
FIG. 4 is a schematic, side, partial cross section view of the tongue assembly and buckle, with the weblock in a locked and partially flexed position.

In a vehicle operating condition where the vehicle occupant 26 is initially pushed forward into the webbing 30, the forces from the torso and lap of the occupant 26 act on the torso 32 and lap 34 portions, respectively, causing the housing 68 to begin to pivot about the axis 64 of the bar 58 (shown in FIG. 4). This movement causes the lock feature 80 to press into the webbing 30, preventing the webbing 30 from sliding through the tongue assembly 36. That is, the weblock 66 locks the webbing 30 in the tongue assembly 36, to fix which part of the webbing 30 is in the torso portion 32 and which part is in the lap portion 34. As this vehicle condition progresses and the occupant 26 is pushed further into the webbing 30, the housing 68 is further pivoted about the axis 64, with the weblock 66 maintaining the webbing 30 locked in the tongue assembly 36 (shown in FIG. 5).

Figure 5:
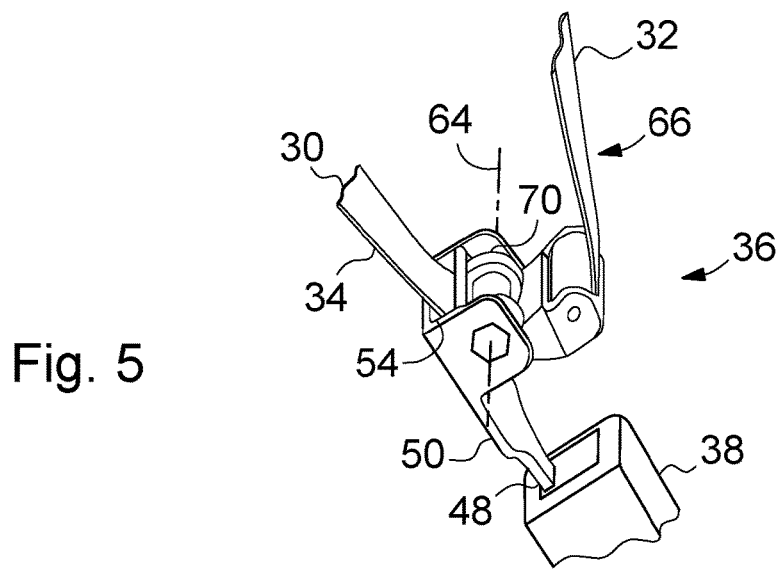
FIG. 5 is a schematic perspective view of the tongue assembly and buckle, with the weblock in a locked and fully flexed position.
Figure 6:
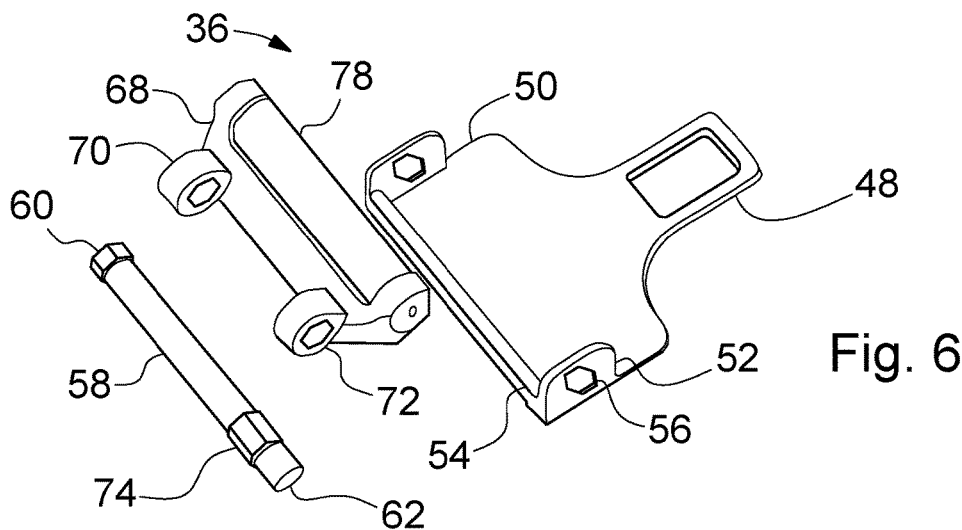
FIG. 6 is an exploded, schematic perspective view of the weblock.

Since the motion between the position of FIGS. 4 and 5 has the belt webbing 30 locked, the lap portion 34 maintains its position, essentially without any payout, restraining movement of the occupant 26. The lap portion 34 having "essentially" no may possibly include a very small amount of additional tension/tightening of the lap portion 34, but this is likely quite minimal and so the effect is essentially the same as no payout in the lap portion 34 when the belt webbing is locked. In addition, since the housing 68 pivots about the axis 64 of the bar 58 between the positions of FIGS. 4 and 5, this creates, in effect, a small amount of additional payout of the torso portion 32 of the webbing 30, while overall restraining movement of the occupant 26. As used herein, including in the claims, the term payout means providing webbing 30 in a way that provides additional slack in the lap portion 34 or the torso portion 32—this slack in the webbing (from payout) not coming from the ends of the webbing 30 but from the mechanical functioning of the tongue assembly 36.

Thus, this weblock 66 in the tongue assembly 36 allows for securing the occupant's hips while allowing for a small amount of payout of the torso portion 32 to allow for additional displacement of the occupant's torso, in a controlled manner, during a vehicle operating condition where the occupant is pushed into the seatbelt webbing 30. This may allow for reduced chest load and deflection of the occupant 26 during such vehicle events. The amount of payout may be controlled by the dimensions and stiffness of the various components of the tongue assembly 36, such as for example the length, diameter and/or material stiffness of the bar 58, as well as the sizing and/or material stiffness of the various portions of the housing 68.

As part of the weblock 66 allowing for a small amount of controlled torso portion 32 payout while locking the lap portion 34 to essentially prevent payout, some elements may have a flexing capability. This flexing capability may take the form of twisting, crushing (compressing), bending, rotating or other form of deformation. Thus, when using the term "flexing" herein, including in the claims, this may include such forms of deformation as just discussed above. This flexing is on a macro-scale, allowing for noticeable torso portion 32 payout, rather than a micro-scale (as every material subjected to a force has some deformation, at least on a microscopic scale).

For example, the housing 68 may be formed from an elastomeric material that allows for bending when a tension load is applied to the torso portion 32. With such an arrangement, if the bar 58 has the keyed end 60 in a keyed tongue aperture 56 to prevent that end of the bar 58 from rotating relative to the tongue plate 50, and at least one of the channels 72 in the bar supports 70 are keyed to align with the keyed midsection 74 of the bar 58, then the bar supports 70 may have minimal rotation relative to the bar 58 under torso portion loading. In such a case, the housing 68, under a loading of the torso portion 32, flexes adjacent to the bar supports 70, providing for the small payout of the torso portion 32 when the weblock 66 is locked. That is, the flexing shown between the generally unloaded webbing situation shown in FIGS. 2 and 3, and the loaded situation shown in FIG. 5.

In another example, the bar 58 may be formed from an elastomeric material that allows for twisting of the bar 58 when the torso portion 32 is loaded while the weblock 66 is locked. With such an arrangement, the bar 58 has the keyed end 60 in a keyed tongue aperture 56 to prevent that end of the bar 58 from rotating relative to the tongue plate 50, and at least one of the channels 72 in the bar supports 70 are keyed to align with the keyed midsection 74 of the bar 58, then the bar supports 70 may have minimal rotation relative to the bar 58 under torso portion loading. In such a case, the bar 58, under a loading of the torso portion 32 flexes by twisting about the axis 64, allowing for a rotation of the housing 68, which in turn, provides for a small payout of the torso portion 32 when the weblock 66 is locked.

The present embodiment of FIGS. 2-6 preferably has both an elastomeric housing 68 and elastomeric bar 58, in which case, both elements provide some flexing, which results in the small amount of payout of the torso portion 32. They amount of force/torsion needed to cause the bending in the housing 68 and the twisting in the bar 58 can be set at different levels of force/torque imparted to the webbing 30. In such a case, the flexing may occur sequentially rather than simultaneously with the housing 68 and bar 58. Although, if one does not wish to have the flexing of both the housing 68 and bar 58, then one may configure one or the other to be stiff while only the other is flexible under seatbelt loading conditions. The dimensional geometry of the components may be set for the particular application in order to achieve the desired amount of torso portion payout.

Figure 7:
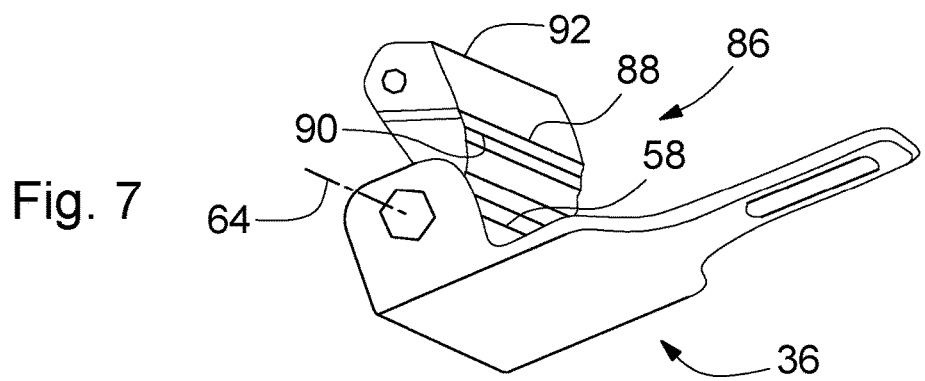
FIG. 7 is a schematic perspective view of a weblock according to a second embodiment.
Figure 8:
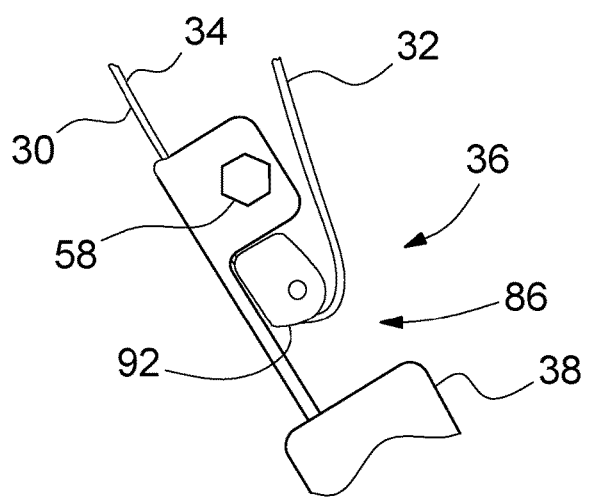
FIG. 8 is a schematic side view of the tongue assembly and buckle, with the weblock in an unlocked position according to the second embodiment.
Figure 9:
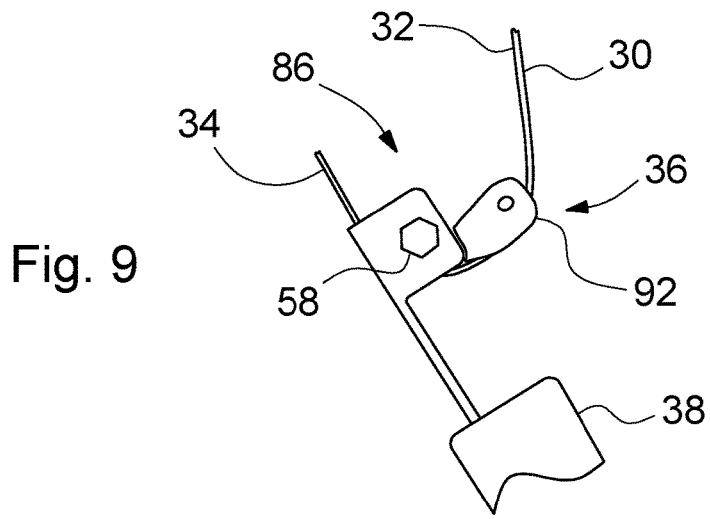
FIG. 9 is a view similar to FIG. 8, but with the weblock in a locked, flexed position.

FIGS. 7-9 (discussed with reference to FIG. 1) illustrate the buckle 38 and tongue assembly 36, with an alternative weblock 86. In this embodiment, the lock feature 88 of the lock 90 are integral to the housing 92. The lock feature 88 is a slot extending axially across the housing 92, through which the webbing 30 extends. With the weblock 86 in an unlocked position (shown in FIG. 8), the webbing 30 can relatively freely slide back-and-forth between the torso portion 32 and the lap portion 34.

On the other hand, in a vehicle operating condition where the vehicle occupant 26 is initially pushed forward into the webbing 30, the forces from the torso and lap of the occupant 26 act on the torso 32 and lap 34 portions, respectively, causing the housing 92 to pivot (shown in FIGS. 7 and 9) about the axis 64 of the bar 58. This movement causes the lock feature 88 to press into the webbing 30, preventing the webbing 30 from sliding through the tongue assembly 36. That is, the weblock 86 locks the webbing 30 in the tongue assembly 36, to fix which part of the webbing 30 is in the torso portion 32 and which part is in the lap portion 34.

Again, either or both of the bar 58 and housing 92 may be the component(s) that flex(es), resulting in the small amount of payout of the torso portion 32 while essentially preventing payout of the lap portion 34 when the weblock 86 is in a locked position. The operation, then, is essentially the same as in the first embodiment, and so will not be repeated here.

Figure 10:
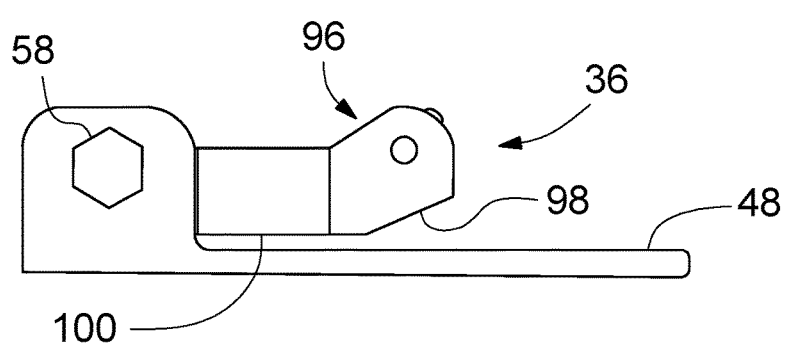
FIG. 10 is a schematic side view of a weblock according to a third embodiment.

FIG. 10 (discussed with reference to FIG. 1) illustrates the tongue assembly 36, with an alternative weblock 96. In this embodiment, the housing 98 includes an elongated elastomeric portion 100 between the bar 58 and the weblock 96. This extends the housing 98 out farther along the tongue 48, which may add to the overall length of the tongue assembly 36. Nevertheless, this additional elastomeric portion 100 allows for additional flexing (in this case a compression type of crushing), which increases the amount of torso portion payout under a vehicle operating condition where the vehicle occupant 26 is initially pushed forward into the webbing 30. The housing 98 and/or the bar 58 may thereafter flex (or simultaneously if so desired) as the occupant 26 loads the webbing 30 further. This additional flexing of the housing 98 and/or bar 58 may look similar to the weblock locked position as shown in the embodiment of FIG. 9 (but with the added portion 100 in a compressed configuration).

Figure 11:
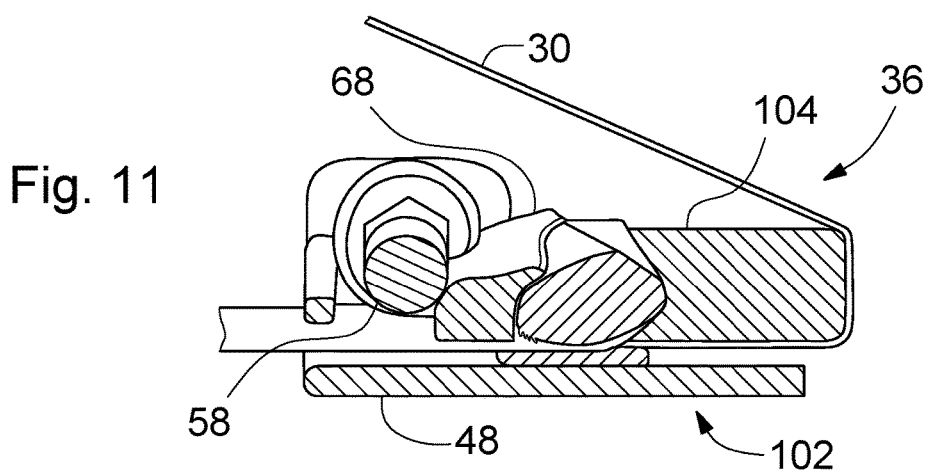
FIG. 11 is a schematic, perspective, partial cross section view of a weblock according to a fourth embodiment.

FIG. 11 (discussed with reference to FIG. 1) illustrates the tongue assembly 36, with an alternative weblock 102. In this embodiment, an elongated elastomeric portion 104 extends outward away from the housing 68 and supports a portion of the webbing 30. This extends the housing 68 out farther along the tongue 48, which may add to the overall length of the tongue assembly 36. Nevertheless, this additional elastomeric portion 104 allows for additional flexing (in this case a compression type of crushing), which increases the amount of payout under a vehicle operating condition where the vehicle occupant 26 is initially push forward into the webbing 30. The housing 68 and/or the bar 58 may thereafter flex (or simultaneously if so desired) as the occupant 26 loads the webbing 30 further. This additional flexing of the housing 68 and/or bar 58 may look similar to the weblock locked position as shown in the embodiment of FIG. 5 (but with the added portion 104 in a compressed configuration).

Figure 12:
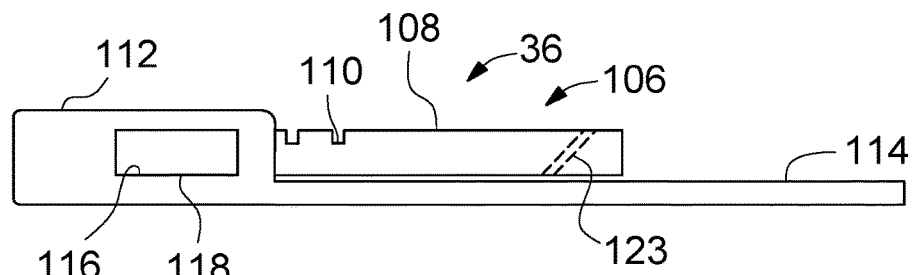
FIG. 12 is a schematic, side view of a weblock, in an unlocked position, according to a fifth embodiment.
Figure 13:
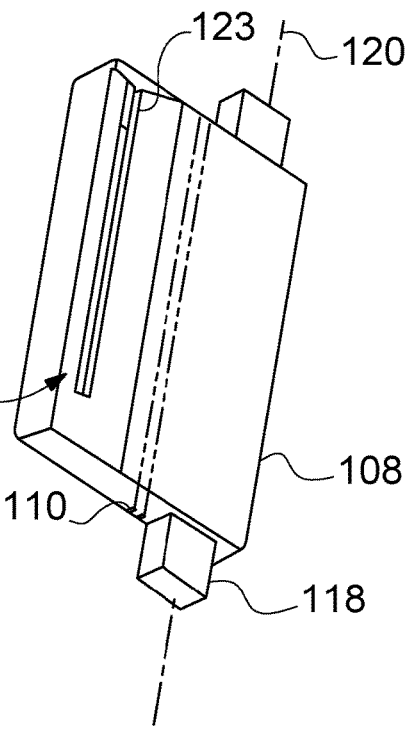
FIG. 13 is a schematic, perspective view of a housing according to the fifth embodiment.
Figure 14:
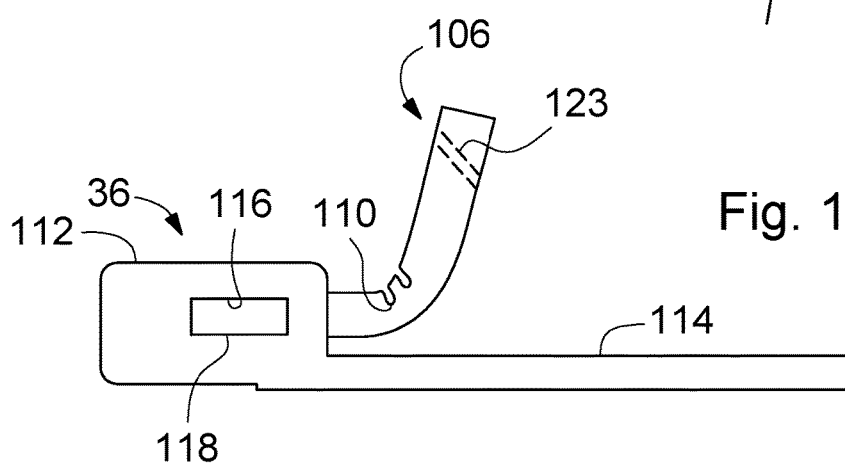
FIG. 14 is a view similar to FIG. 12, but with the weblock in a locked, flexed position.
Figure 15:
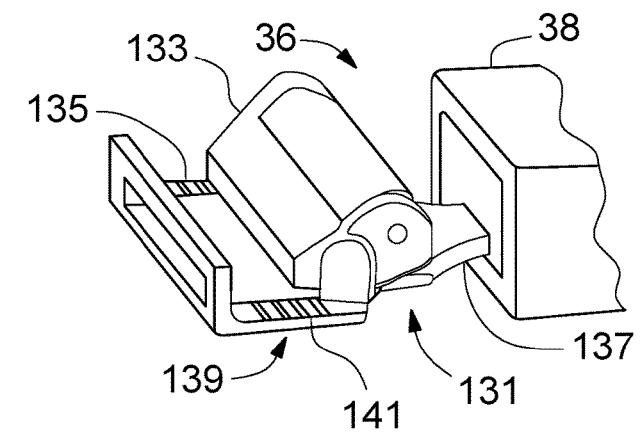
FIG. 15 is a schematic, perspective view of a tongue assembly and buckle, with the weblock in an unlocked position, according to a sixth embodiment.
Figure 16:
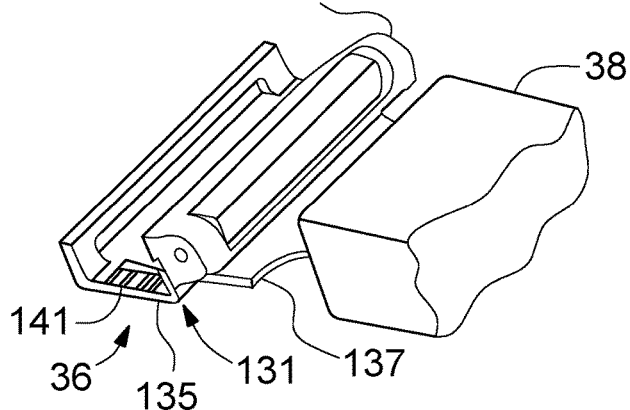
FIG. 16 is a schematic, perspective view of the tongue assembly and buckle of FIG. 15.

FIGS. 12-14 (discussed with reference to FIG. 1) illustrates the tongue assembly 36, with an alternative weblock 106. In this embodiment, the weblock 106 comprises a housing 108 that is a flat (in its unloaded position) plate, with flexing notches 110 recessed into a surface opposite from the surface that makes contact with the webbing 30, and with an integral bar 118 having keyed (may be rectangular shaped or other keyed shape). The tongue walls 112 of the tongue 114 include corresponding keyed (in this instance rectangular shaped) tongue apertures 116 for receiving the bar 118 and preventing rotation of the bar 118 about the axis 120. The number, spacing, depth and width of the flexing notches 110 may be engineered to provide the desired amount of flexing per amount of load applied by the occupant 26 to the webbing 30.

The lock feature 123 of the lock 125 is integral to the housing 108. The lock feature 123 is a slot extending axially across the housing 108, through which the webbing 30 extends. With the weblock 106 in an unlocked position (shown in FIG. 12), the webbing 30 can relatively freely slide back-and-forth between the torso portion 32 and the lap portion 34.

On the other hand, in a vehicle operating condition where the vehicle occupant 26 is pushed forward into the webbing 30, the forces from the torso and lap of the occupant 26 act on the torso 32 and lap 34 portions, respectively, causing the housing 108 to flex about the flexing notches 110 (shown in FIG. 14). This movement causes the lock feature 123 to press into the webbing 30, preventing the webbing 30 from sliding through the tongue assembly 36. That is, the weblock 106 locks the webbing 30 in the tongue assembly 36, in order to fix which part of the webbing 30 is in the torso portion 32 and which part is in the lap portion 34. Again, this weblock 106 allows for a small amount of payout of the torso portion 32 while essentially preventing payout of the lap portion 34 as the weblock moves into the locked position.

FIGS. 15-18 (discussed with reference to FIG. 1) illustrates the buckle 38 and tongue assembly 36, with an alternative weblock 131. In this embodiment, the weblock 131 comprises a housing 133 that directly connects to flexible flanges 135 that are integral with and extend from the tongue plate 137. As such, the housing 133, in effect, forms the bar connecting to the tongue 139. The flexible flanges 135 may include flexing notches 141 recessed into a surface facing the webbing 30 but spaced laterally outward from the webbing 30. Alternatively, the flexible flanges 135 may be separate pieces, which may be made from a different material, from the tongue plate 137 which is essentially permanently affixed to the tongue plate 137.

Figure 17:
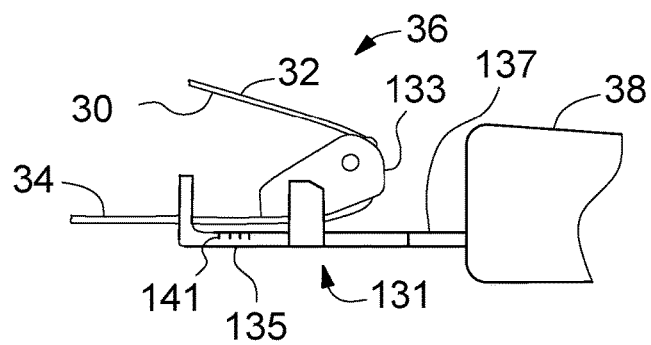
FIG. 17 is a schematic, side view of the tongue assembly and buckle of FIG. 15.
Figure 18:
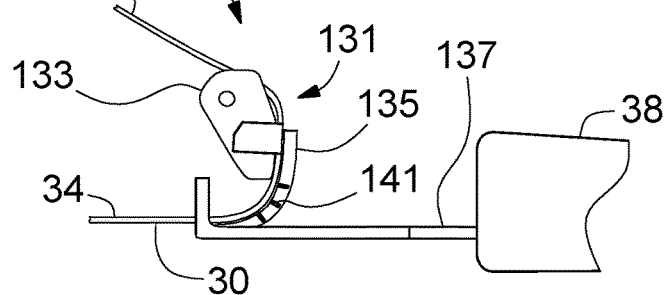
FIG. 18 is a side view similar to FIG. 17, but with the weblock in a locked, flexed position.

In a vehicle operating condition where the vehicle occupant 26 is initially pushed forward into the webbing 30, the forces from the torso and lap of the occupant 26 act on the torso 32 and lap 34 portions, respectively, causing the housing 133 to begin to pivot (shown in FIG. 17). This movement causes the lock feature (such as element 80 in FIGS. 3-4) to press into the webbing 30, preventing the webbing 30 from sliding through the tongue assembly 36. That is, the weblock 131 locks the webbing 30 in the tongue assembly 36, to fix which part of the webbing 30 is in the torso portion 32 and which part is in the lap portion 34. As this vehicle condition progresses and the occupant 26 is pushed further into the webbing 30, the housing 133 is further pivoted as the flexible flanges 135 flex (in this case bending), with the weblock 131 maintaining the webbing 30 locked in the tongue assembly 36 (shown in FIG. 18).

Figure 19:
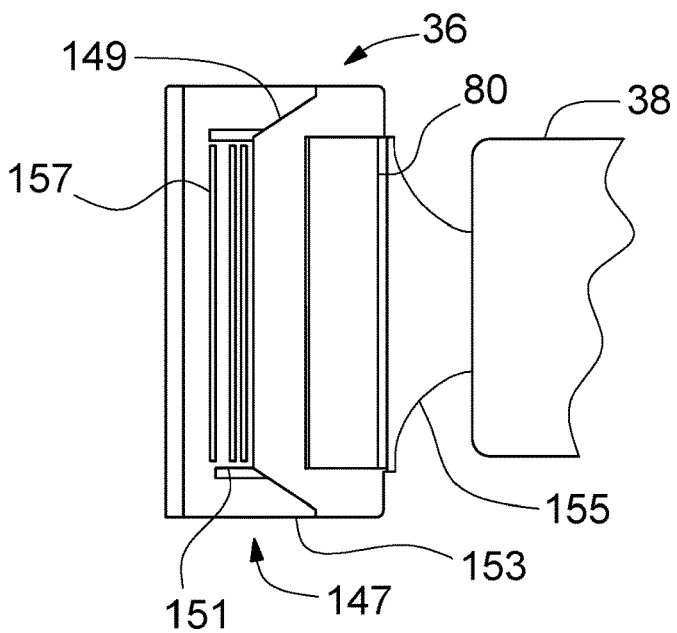
FIG. 19 is a schematic, plan view of a tongue assembly and buckle according to a seventh embodiment.
Figure 20:
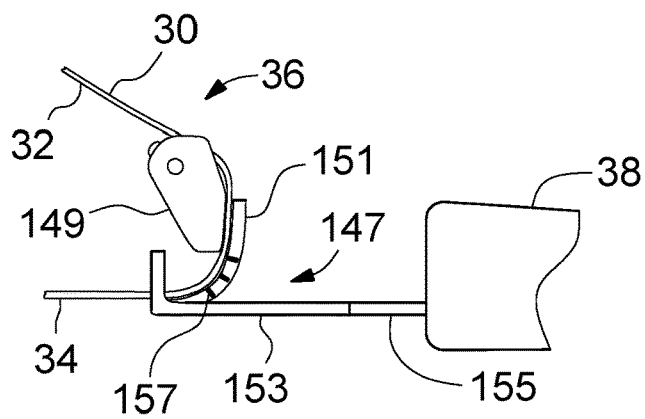
FIG. 20 is a schematic, side view of the tongue assembly and buckle according to the embodiment of FIG. 19, but with the weblock in a locked, flexed position.

FIGS. 19-20 (discussed with reference to FIG. 1) illustrates the buckle 38 and tongue assembly 36, with an alternative weblock 147. In this embodiment, the weblock 147 comprises a housing 149 that directly connects to a flexible flange 151 that is integral with and extend from the tongue plate 153. As such, the housing 149, in effect, forms the bar connecting to the tongue 155. The flexible flange 151 may include flexing notches 157 recessed into a surface facing and adjacent to the webbing 30. Alternatively, the flexible flange 151 may be a separate piece, which may be made from a different material, from the tongue plate 153 which is essentially permanently affixed to the tongue plate 153.

In a vehicle operating condition where the vehicle occupant 26 is initially pushed forward into the webbing 30, the forces from the torso and lap of the occupant 26 act on the torso 32 and lap 34 portions, respectively, causing the housing 149 to begin to pivot (similar to pivoting in embodiment of FIG. 17). This movement causes the lock feature (such as element 80 in FIGS. 3-4) to press into the webbing 30, preventing the webbing 30 from sliding through the tongue assembly 36. That is, the weblock 147 locks the webbing 30 in the tongue assembly 36, to fix which part of the webbing 30 is in the torso portion 32 and which part is in the lap portion 34. As this vehicle condition progresses and the occupant 26 is pushed further into the webbing 30, the housing 149 is further pivoted as the flexible flange 151 flexes (in this case bending), with the weblock 147 maintaining the webbing 30 locked in the tongue assembly 36 (shown in FIG. 20).

Figure 21:
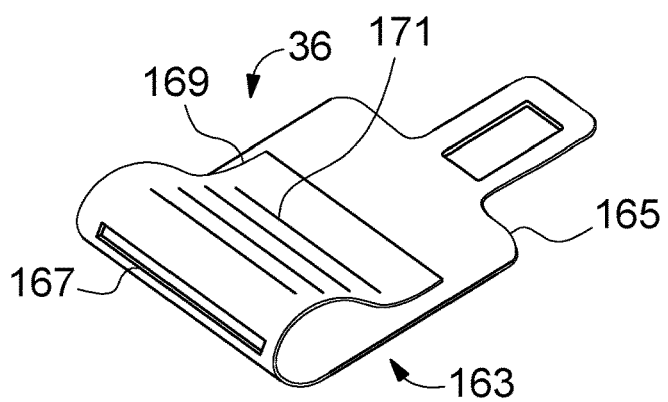
FIG. 21 is a schematic, perspective view of a weblock according to an eighth embodiment.

FIG. 21 (discussed with reference to FIG. 1) illustrates the tongue assembly 36, with an alternative weblock 163. This embodiment is essentially the same as the embodiment of FIGS. 19-20, but with the tongue plate 165 being formed in a different shape. The tongue plate 165 is formed by bending the material to form a webbing guide slot 167 and the flexible flange 169, with the flexing notches 171. The operation is essentially the same as for the embodiment of FIGS. 19-20 and so will not be discussed further herein.

While certain embodiments of the present invention have been described in detail, those familiar with the art to which this invention relates will recognize various alternative designs and embodiments for practicing the invention as defined by the following claims.

The invention claimed is:

1. A method of operating a vehicle seatbelt, comprising;
   allowing webbing to slide between a lap portion and a torso portion through an unlocked weblock of a tongue assembly; and
   upon forces exerted on the webbing by an occupant, the weblock locking the webbing from movement between the lap and torso portions while flexing to allow for webbing payout in the torso portion, wherein the tongue assembly includes a bar secured to a tongue plate and a housing secured to the bar, with the bar flexing by twisting when the weblock is locked, and wherein the housing flexes by bending when the weblock is locked.

2. The method of claim 1 wherein, with the locked weblock, the lap portion does not provide additional payout.

3. The method of claim 1 wherein the weblock includes a cylindrical member adjacent to the housing, the member having outward extending teeth that engage the webbing in the weblock locked position to prevent the webbing from sliding between the lap and torso portions.

4. A seatbelt comprising:
   a tongue assembly having a weblock and a tongue selectively securable to a buckle;
   a webbing extending through the weblock between a torso portion and a lap portion; and
   the weblock allowing for the webbing sliding between the torso and lap portions when in an unlocked position and flexing in a locked position to prevent sliding between the lap and torso portions while providing webbing payout in the torso portion, wherein the tongue assembly includes an elastomeric bar secured to a tongue plate and a housing secured to the bar, with the bar flexing by twisting when the weblock is locked, and wherein the housing is elastomeric and flexes by bending when the weblock is locked.

5. The seatbelt of claim 4 wherein the elastomeric housing flexes by compression crushing when the weblock is locked.

6. A method of operating a vehicle seatbelt, comprising;
   allowing webbing to slide between a lap portion and a torso portion through an unlocked weblock of a tongue assembly; and
   upon forces exerted on the webbing by an occupant, the weblock locking the webbing from movement between the lap and torso portions while flexing to allow for webbing payout in the torso portion, wherein the tongue assembly includes a housing secured to a tongue plate, with the housing flexing by compression crushing when the weblock is locked, and wherein the flexing is also by bending of the housing when the weblock is locked.

* * * * *